United States Patent
Schultz

(10) Patent No.: US 10,260,544 B2
(45) Date of Patent: Apr. 16, 2019

(54) CONNECTOR AND CONNECTOR ASSEMBLY

(71) Applicant: Schultz Mfg., Inc., Oregon City, OR (US)

(72) Inventor: Matthew R. Schultz, Oregon City, OR (US)

(73) Assignee: SCHULTZ MFG., INC., Oregon City, OR (US)

( * ) Notice: Subject to any disclaimer, the term of this patent is extended or adjusted under 35 U.S.C. 154(b) by 180 days.

(21) Appl. No.: 15/240,918

(22) Filed: Aug. 18, 2016

(65) Prior Publication Data
US 2018/0051733 A1    Feb. 22, 2018

(51) Int. Cl.
*A01G 9/12*    (2006.01)
*F16B 2/06*    (2006.01)
*F16B 7/04*    (2006.01)

(52) U.S. Cl.
CPC .............. *F16B 7/0493* (2013.01); *A01G 9/12* (2013.01); *F16B 2/065* (2013.01)

(58) Field of Classification Search
CPC ......... Y10T 403/7105; Y10T 403/7129; Y10T 403/7141; Y10T 403/7171; Y10T 403/7194; A01G 9/12; F16B 7/04; F16B 7/044; F16B 7/048; F16B 7/0493; F16B 7/18; F16B 7/185; F16B 2/065; B01L 9/50
See application file for complete search history.

(56) References Cited

U.S. PATENT DOCUMENTS

| | | | | |
|---|---|---|---|---|
| 1,195,889 A | * | 8/1916 | Willeford | E04G 7/14 248/229.14 |
| 1,987,826 A | * | 1/1935 | Heumann | A47F 3/12 211/182 |
| 2,272,852 A | * | 2/1942 | Schaefer | B01L 9/50 411/337 |
| 2,638,301 A | * | 5/1953 | Smith | B01L 9/50 24/274 R |
| 2,879,087 A | * | 3/1959 | Haglund | E04G 7/14 211/182 |
| 2,970,798 A | * | 2/1961 | Friotchle | B01L 9/50 24/335 |
| 3,185,509 A | * | 5/1965 | Welsher | B01L 9/50 24/335 |
| 4,115,966 A | * | 9/1978 | DeLee | G09F 7/18 248/229.26 |
| 4,157,226 A | * | 6/1979 | Reiter | B43L 13/06 403/209 |

(Continued)

*Primary Examiner* — Jonathan P Masinick
(74) *Attorney, Agent, or Firm* — Alleman Hall Creasman & Tuttle LLP

(57) ABSTRACT

A connector and connector assembly are disclosed. The connector may have a body with a first U-shaped surface defining a first axis, a second U-shaped surface defining a second axis that is orthogonal to the first axis, a first fastener that penetrates a wall of the first U-shaped structure and is configured to clamp a rod within the first U-shaped structure, and a second fastener that penetrates a wall of the second U-shaped structure and is configured to clamp a rod within the second U-shaped structure. The connector assembly may have one or more rods secured within one or more connector bodies by one or more fasteners.

14 Claims, 8 Drawing Sheets

(56) References Cited

U.S. PATENT DOCUMENTS

| | | | | |
|---|---|---|---|---|
| 4,421,434 A * | 12/1983 | Magner | F16B 7/0486 |
| | | | 403/175 |
| 4,433,935 A * | 2/1984 | Main | E01F 9/662 |
| | | | 248/125.3 |
| 4,889,322 A * | 12/1989 | Wagner | E04H 17/08 |
| | | | 256/36 |
| D314,503 S * | 2/1991 | Gilman | D8/394 |
| 5,380,325 A * | 1/1995 | Lahille | A61B 17/7041 |
| | | | 403/294 |
| 5,492,294 A * | 2/1996 | Haeussler | E01C 19/008 |
| | | | 248/156 |
| 5,593,143 A * | 1/1997 | Ferrarin | E04H 17/08 |
| | | | 248/68.1 |
| 6,585,207 B2 * | 7/2003 | Ibbitson | B01L 9/50 |
| | | | 248/229.2 |
| 6,634,823 B2 * | 10/2003 | Sciortino | F16B 7/0426 |
| | | | 403/13 |
| 7,992,752 B2 * | 8/2011 | Oetlinger | B26D 7/1818 |
| | | | 225/104 |
| 8,888,777 B2 * | 11/2014 | Mullaney | A61B 17/645 |
| | | | 606/324 |
| 9,305,475 B2 * | 4/2016 | White | G09F 21/04 |
| 2006/0053689 A1 * | 3/2006 | Smith | A01G 9/12 |
| | | | 47/45 |

* cited by examiner

CONNECTOR AND CONNECTOR ASSEMBLY

BACKGROUND

Providing support to a plant can be essential for its growth and maturity. As a plant grows, an alternate size or shape of support structure may be beneficial. Furthermore, diverse types of plants may require various configurations of plant support structures. However, presently available plant supports are fixed in structure and limited in their adaptability.

SUMMARY

To address the above issues, systems and methods for a plant support structure are disclosed herein. According to a first aspect of the disclosure, a connector is provided comprising a body, a first U-shaped structure, a second U-shaped structure, a first fastener, and a second fastener. The first U-shaped structure defines a first axis, and the second U-shaped structure defines a second axis that is orthogonal to the first axis. The first fastener is configured to penetrate a wall of the first U-shaped structure to clamp a rod within the first U-shaped structure, and the second fastener is configured to penetrate a wall of the second U-shaped structure to clamp a rod within the second U-shaped structure. Potential advantages of this configuration are that a rod may be secured at any place along its length, rods of varying length and/or diameter may be secured in the U-shaped structures, and a single connector may secure two rods in an orthogonal orientation.

In this aspect, the first and second U-shaped structures may be configured to have a flat, curved, or polygonal shape. One potential advantage of this configuration is that the first and second U-shaped structures may secure rods possessing specific shapes.

In this aspect, the inner wall of the first U-shaped structure and the inner wall of the second U-shaped structure may be integrally formed. Potential advantages of this configuration is that rods are non-rotatably secured in the first and second U-shaped structures and held in close proximity to one another.

In this aspect, the fasteners may be configured to be threaded. One potential advantage of this configuration is that the fasteners may be securely attached to the connector body.

In this aspect, the fasteners may be thumb screws. One potential advantage of this configuration is that the fasteners are easy to grip and manipulate.

In this aspect, the connector body may be formed of aluminum or aluminum alloy. One potential advantage of this configuration is that the connector is both strong and lightweight.

In this aspect, the outer side wall of the first U-shaped structure may have one or more holes to accept one or more fasteners, and the outer side wall of the second U-shaped structure may have one or more holes to accept one or more fasteners. One potential advantage of this configuration is that more than one fastener could be used to secure a rod in a U-shaped structure.

In another aspect, a connector assembly is described comprising one or more rods secured within one or more connector bodies by one or more fasteners. One potential advantage of this configuration is that the size and shape of the connector assembly is easily customized.

In this aspect, the assembly is configured to form an open framework. One potential advantage of this configuration is that plants of varying types and sizes may be supported in the open framework.

In this aspect, the rods may be configured to have one or more recesses to receive and secure the fasteners. One potential advantage of this configuration is that the rods may be securely detained in the U-shaped structures by the fasteners.

In this aspect, the rods may be configured to have one or more holes to receive and secure the fasteners. One potential advantage of this configuration is that inserting the fastener into the rod would inhibit rotation of the rod such that it is secured in a constant orientation with respect to the U-shaped structure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Selected embodiments of the present disclosure will now be described with reference to the accompanying drawings. It will be apparent to those skilled in the art from this disclosure that the following descriptions of the embodiments of the disclosure are provided for illustration only and not for the purpose of limiting the disclosure as defined by the appended claims and their equivalents.

Figure 1:
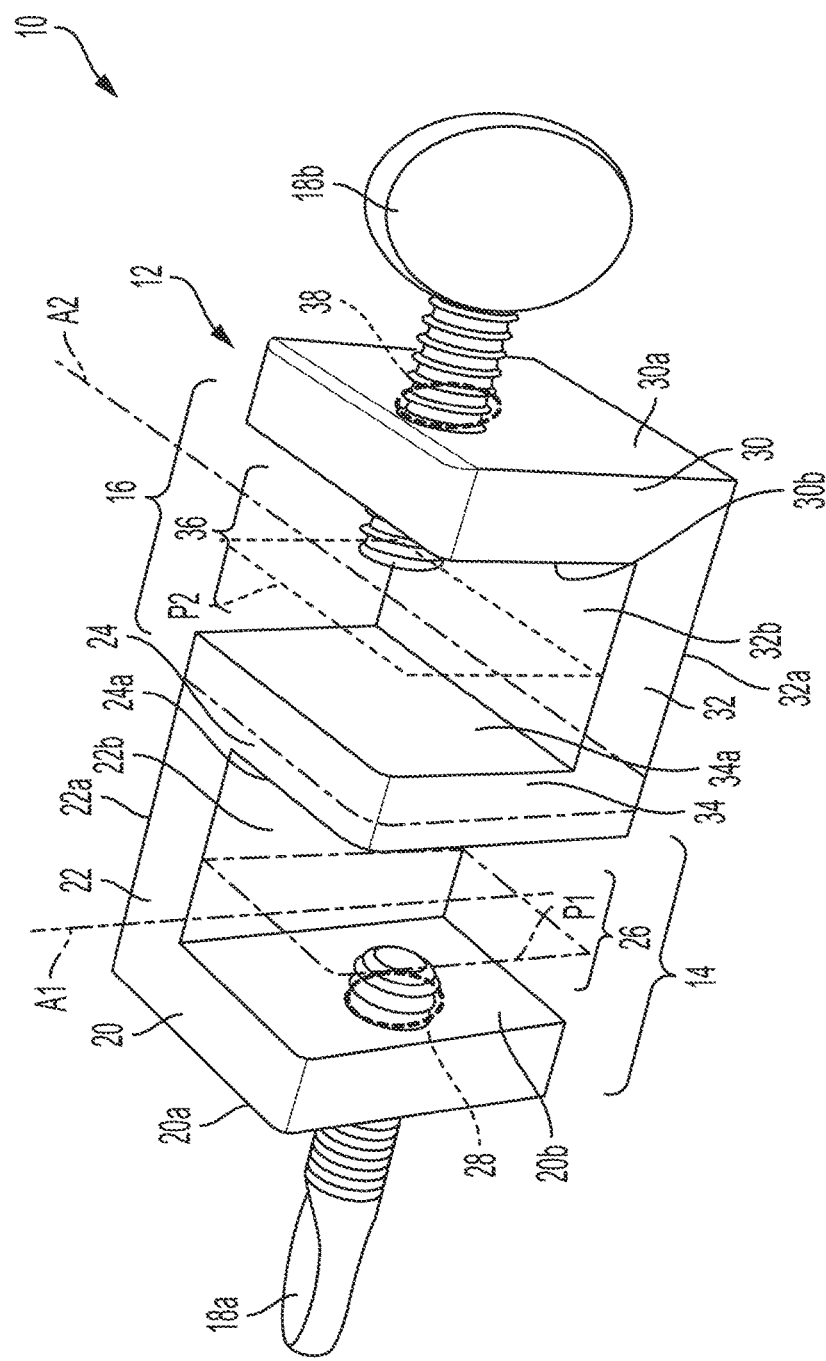
FIG. 1 shows a connector according to one embodiment of the present description.

Referring initially to FIG. 1, one embodiment of a connector 10 is shown. The connector 10 consists of a body 12 and includes at least a first U-shaped structure 14, a second U-shaped structure 16, a first fastener 18a, and a second fastener 18b.

The first U-shaped structure 14 comprises an outer side wall 20, an outer bottom wall 22, and an inner side wall 24. Together, the outer side wall 20, the outer bottom wall 22, and the inner side wall 24 of the first U-shaped structure 14 define a first axis A1 and a center channel 26. As illustrated, the outer side wall 20 of the first U-shaped structure 14 is configured to have an outside surface 20a and an inside surface 20b. Similarly, the outer bottom wall 22 is configured to have an outside surface 22a and an inside surface 22b, and the inner side wall 24 is configured to have an inside surface 24a.

As shown, the inside surfaces 20b, 22b, and 24a of the first U-shaped structure 14 are formed to be flat. Alternatively, one or more of the inside surfaces 20b, 22b, or 24a may be formed in a concave or polygonal shape to secure rods possessing a round or angular shape. For example, the inside surface 22b of the outer bottom wall 22 may be formed to have a curved shape that would nestle and center a round rod secured therein.

In the illustrated embodiment, the first axis A1 is located along a center of the channel 26 in the first U-shaped structure 14. Alternatively, the first axis may A1 be offset from the center of the channel 26.

The second U-shaped structure 16 comprises an outer side wall 30, an outer bottom wall 32, and an inner side wall 34. The inner side wall 34 of the second U-shaped structure 16 is integrally formed with the inner side wall 24 of the first U-shaped structure 14 such that the second U-shaped structure 16 is adjacent and orthogonal to the first U-shaped structure 14 in the connector body 12. With such a construction, the first axis A1 is orthogonal to the second axis A2. In the illustrated embodiment, the connector body 12 is shown to comprise two U-shaped structures 14 and 16; however, a connector body 12 may comprise more than two U-shaped structures with integrally formed inner side walls.

Figure 7A:
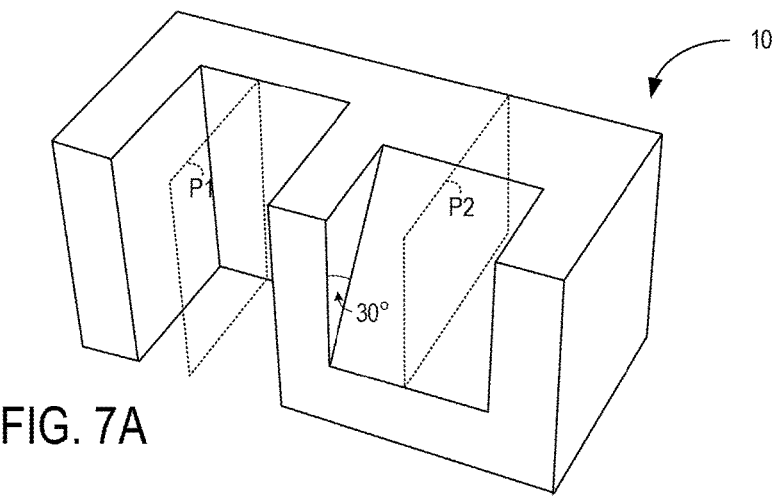
FIGS. 7A, 7B, and 7C show connectors in which the U-shaped channels are offset from each other by 30, 45, and 60 degrees, respectively.
Figure 7B:
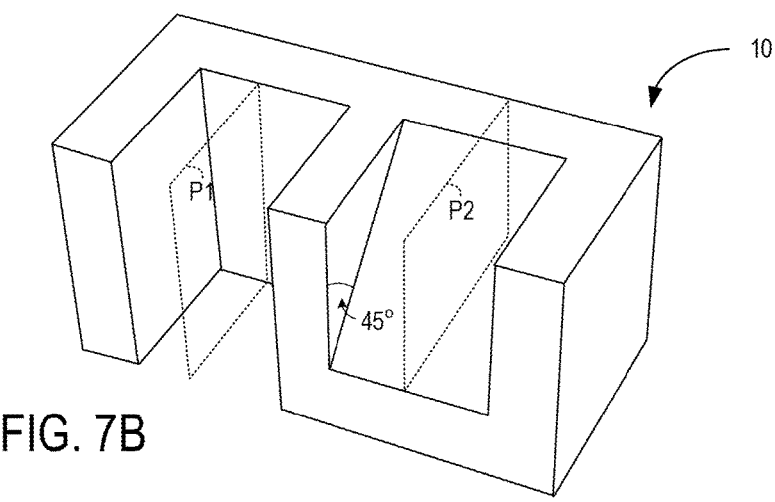
Figure 7C:
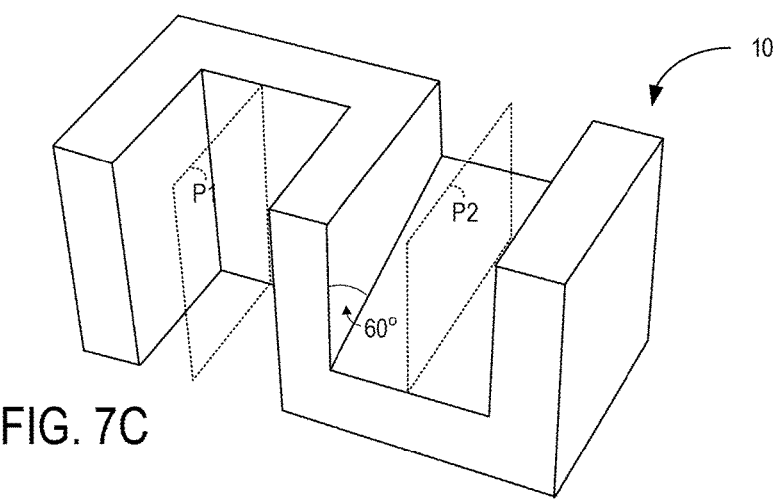

The outer side wall 30, the outer bottom wall 32, and the inner side wall 34 of the second U-shaped structure 16 define a second axis A2 and a second center channel 36 that are orthogonal to the first axis A1 and the first center channel 26. As illustrated, the outer side wall 30 of the second U-shaped structure 16 is configured to have an outside surface 30a and an inside surface 30b. Similarly, the outer bottom wall 32 is configured to have an outside surface 32a and an inside surface 32b, and the inner side wall 34 is configured to have an inside surface 34a. Although the axes of the U-shaped channels are shown to be orthogonal, other in connector embodiments may include U-shaped channels oriented along respective axes that are positioned in parallel planes P1, P2 but offset from each other by other predetermined angles than 90 degrees, such as 30, 45, or 60 degrees, as shown in FIGS. 7A, 7B, and 7C, respectively. It will be appreciated that each of the planes P1, P2 may be parallel to internal side walls of its respective U-shaped structure, and each of the planes may bisect its respective U-shaped structure through an open end of the U-shaped structure.

As shown, the inside surfaces 30b, 32b, and 34a are formed to be flat. Alternatively, one or more of the inside surfaces 30b, 32b, or 34a may be formed in a concave or polygonal shape to secure rods possessing a round or angular shape. For example, the inside surface 32b of the outer bottom wall 32 may be formed to have a curved shape that would nestle and center a round rod secured therein.

In the illustrated embodiment, the second axis A2 is located along a center of the channel 36 in the second U-shaped structure 16. Alternatively, the second axis A2 may be offset from the center of the channel 36.

The first fastener 18a penetrates the outer side wall 20 of the first U-shaped structure 14 by way of a hole 28 and is configured to clamp a rod within the first U-shaped structure 14. The second fastener 18b penetrates the outer side wall 30 of the second U-shaped structure 16 by way of a hole 38 and is configured to clamp a rod within the second U-shaped structure 16. In this embodiment, the first and second fasteners 18a and 18b are threaded. However, a non-threaded fastener such as a pin may also be used to secure a rod. In the illustrated embodiment, the first and second fasteners 18a and 18b are thumb screws with oval heads. An oval head provides a broad surface such that a user may easily grip and adjust a fastener. However, alternate fasteners such as a knurled head thumb screw or a machine screw may also be used.

In any of the embodiments described herein, the body 12 of the connector 10 is preferentially formed of aluminum or an aluminum alloy. Being both strong and lightweight, aluminum is an advantageous material for use in plant supports and scaffold systems. However, the body 12 of the connector 10 of any of the embodiments described herein may be formed of any sufficiently durable material, such as steel or the like.

In the illustrated embodiment, each of the outer side walls 20, 30 has a respective hole 28, 38. It will be appreciated that, in any of the embodiments described herein, the outer side wall 20 of the first U-shaped structure 14 may have one or more holes 28 to accept one or more fasteners 18a. Similarly, the outer side wall 30 of the second U-shaped structure 16 may have one or more holes 38 to accept one or more fasteners 18b.

Figure 2:
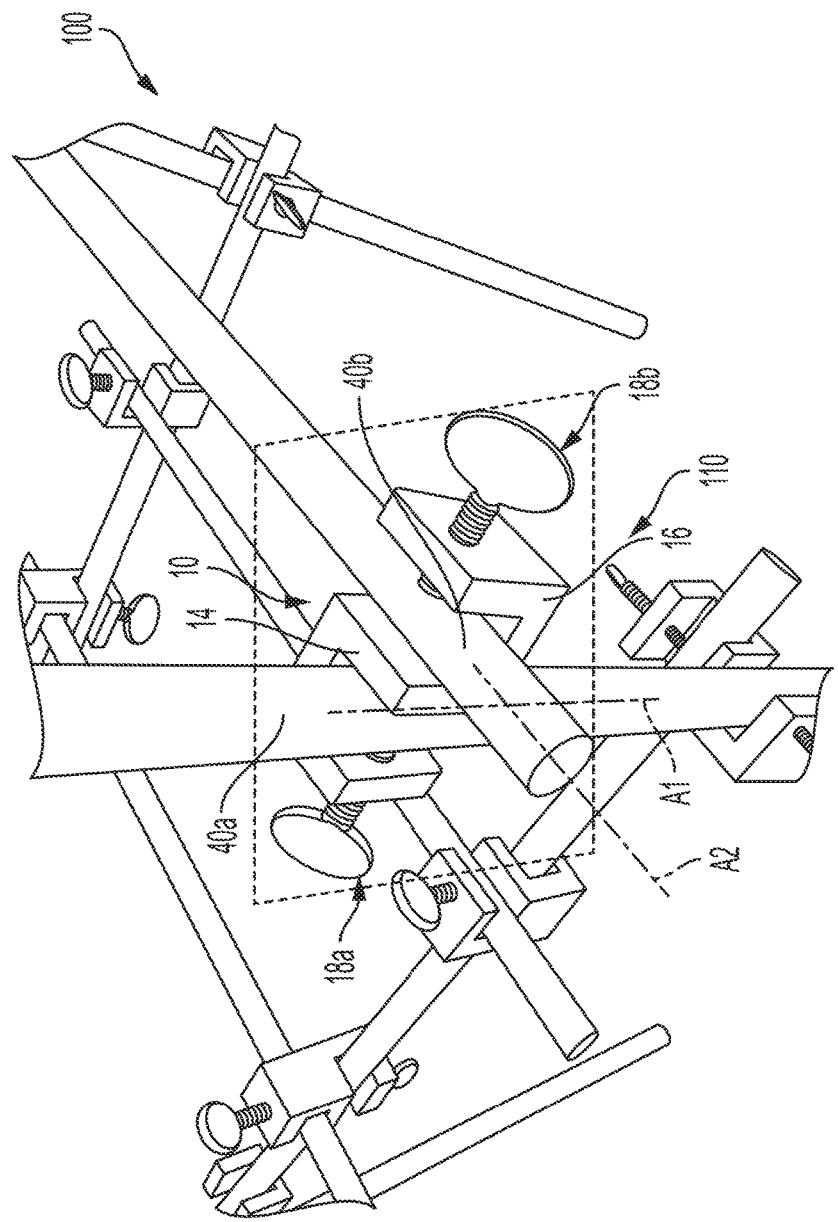
FIG. 2 shows a connector assembly that utilizes the connector of FIG. 1, and rods secured therein, to form a framework.
Figure 8:
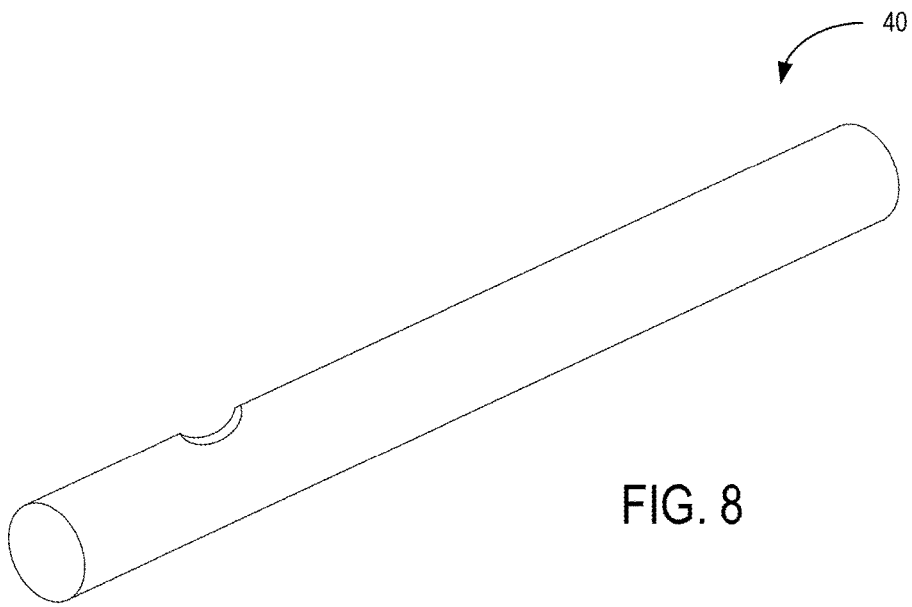
FIG. 8 shows a rod that is formed to have a recess along its length.
Figure 9:
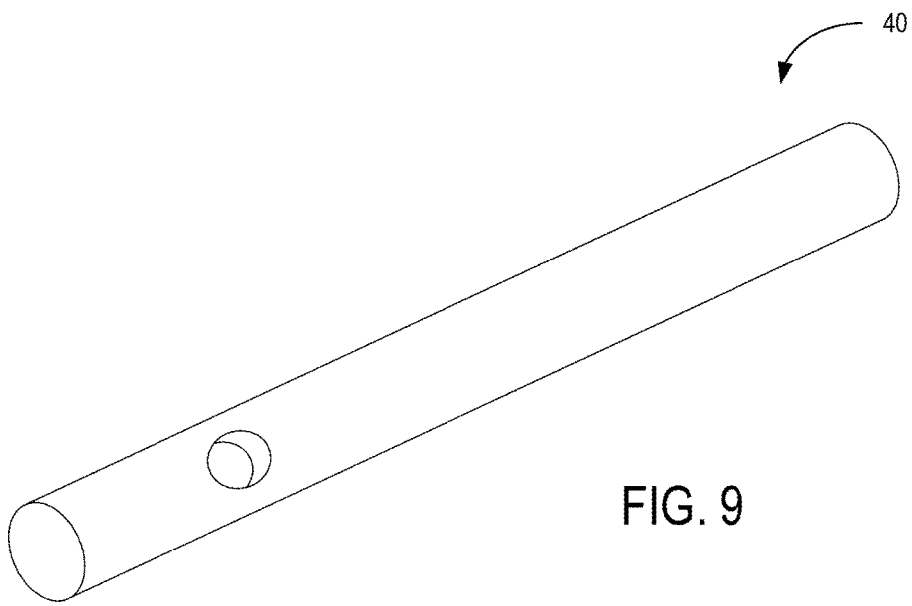
FIG. 9 shows a rod that is formed to have a hole along its length.

FIG. 2 shows a connector assembly 100 according to a first embodiment. A rod 40a is placed in the first U-shaped structure 14 and secured by the first fastener 18a, to be oriented along axis A1. A second rod 40b is placed in the second U-shaped structure 16 and secured by the second fastener 18b, to be oriented along axis A2. The rod 40b secured within the second U-shaped structure 16 is orthogonal to the rod 40a secured within the first U-shaped structure 14. In the illustrated embodiment, the connectors 10 secure rods 40 at a joint 110. The rod 40 is shown as circular in cross section, but it will be appreciated that it may alternatively be square, rectangular, or octagonal in cross section, etc. Additionally, the rod 40 is shown to be solid with a continuous surface, but it will be appreciated that it may alternatively be formed to have indents or holes along its length, as shown in FIGS. 8 and 9, which may help promote secure fastening with fasteners 18a and 18b.

In FIGS. 3-6, additional configurations of the connector assembly 100 are shown. As illustrated, one or more connectors 10 may secure one or more rods 40 organized in any number of configurations. The example structures shown herein may be placed in a planting pot for use as a plant support framework.

Figure 3:
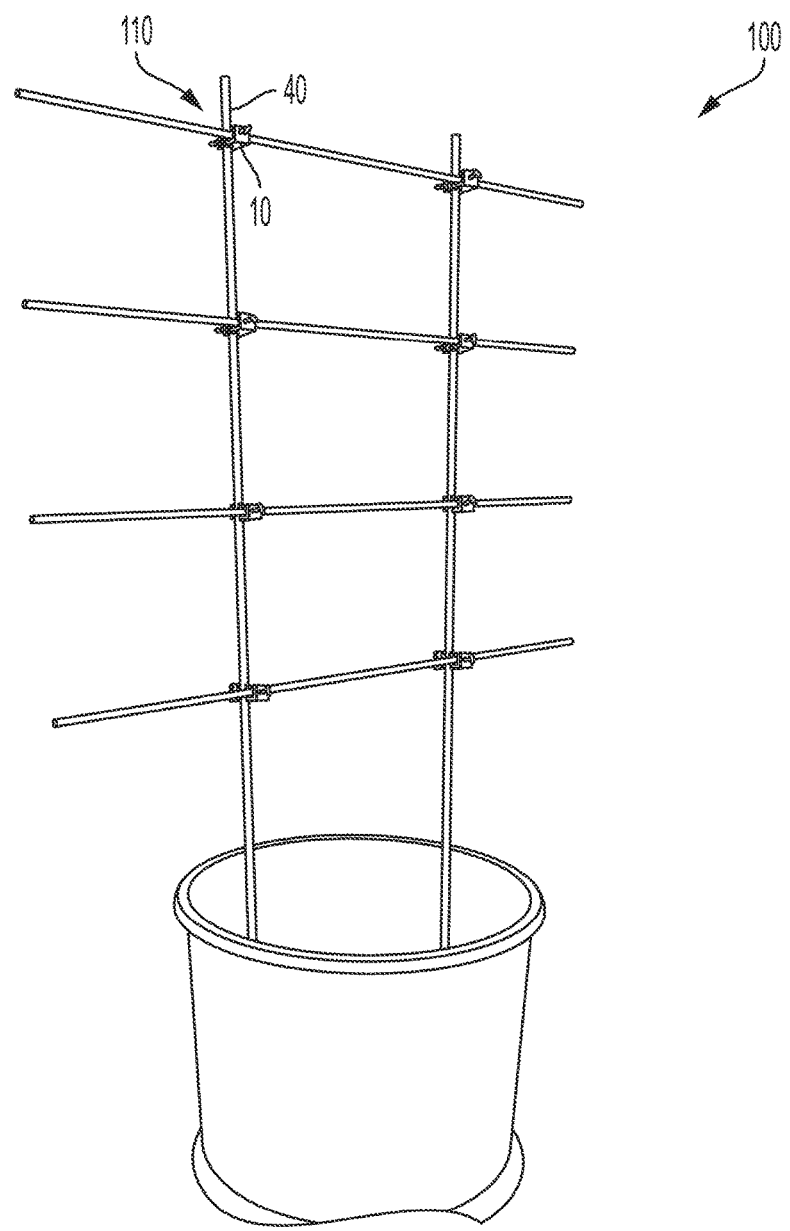
FIG. 3 shows a connector assembly arranged in an upright configuration, placed in a planting pot for use as a plant support framework.

FIG. 3 shows a connector assembly 100 in which vertical rods 40 are secured to parallel rods 40 by connectors 10 at joints 110. Each connector 10 is oriented in the same direction such that the vertical rods 40 connect to the horizontal rods 40 to form an upright framework in a single plane.

Figure 4:
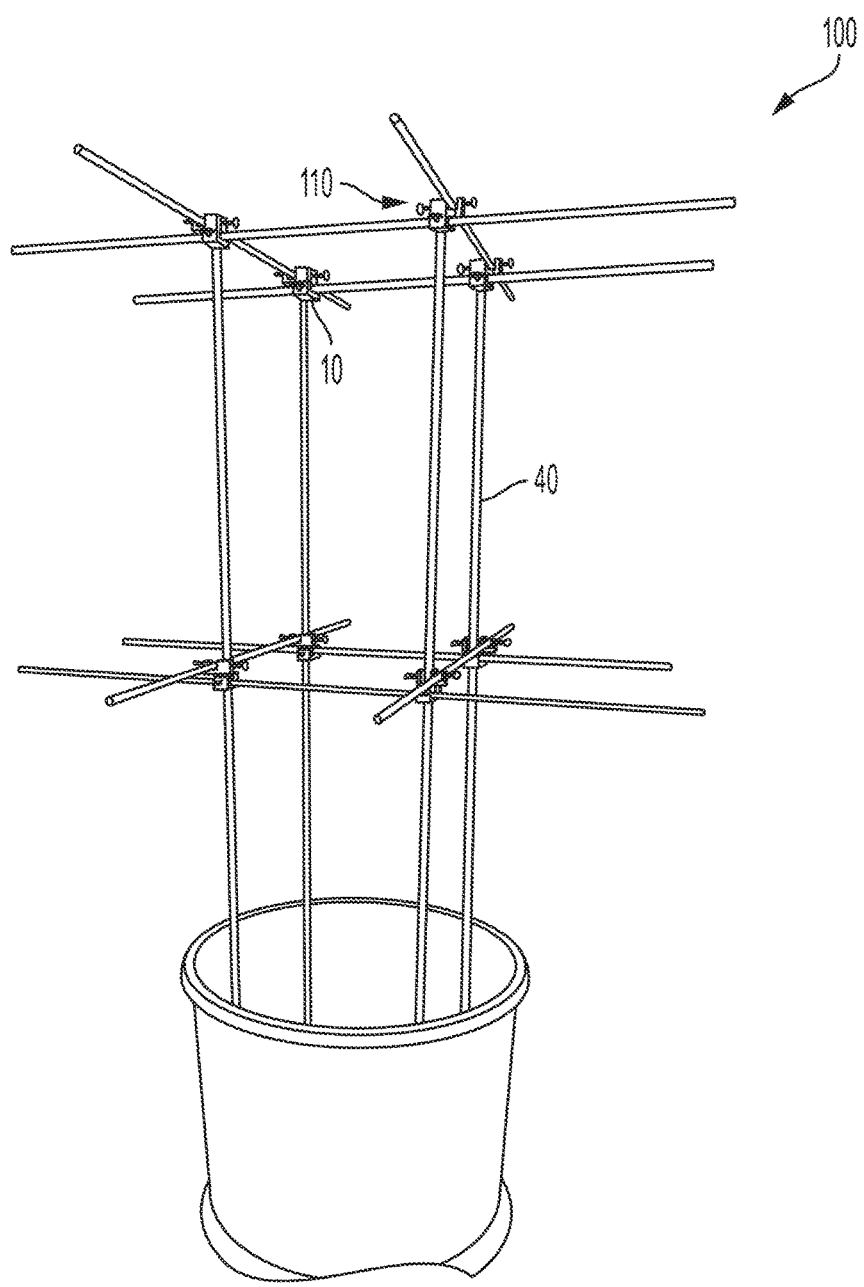
FIG. 4 shows a connector assembly arranged in a cage-like configuration, placed in a planting pot for use as a plant support framework.

In FIG. 4, a connector assembly 100 is arranged in a cage-like support structure is shown. In this configuration, vertical rods 40 are placed into a planter pot, and one or more connectors 10 are secured along each vertical rod 40 at the same height. Each connector 10 also secures a horizontal rod 40 that is orthogonal to the vertical rod 40. Horizontal rods 40 are positioned in the same plane to form an open structure. This configuration demonstrates how individual rods 40 may participate in one or more joints 110 to create a framework.

Figure 5:
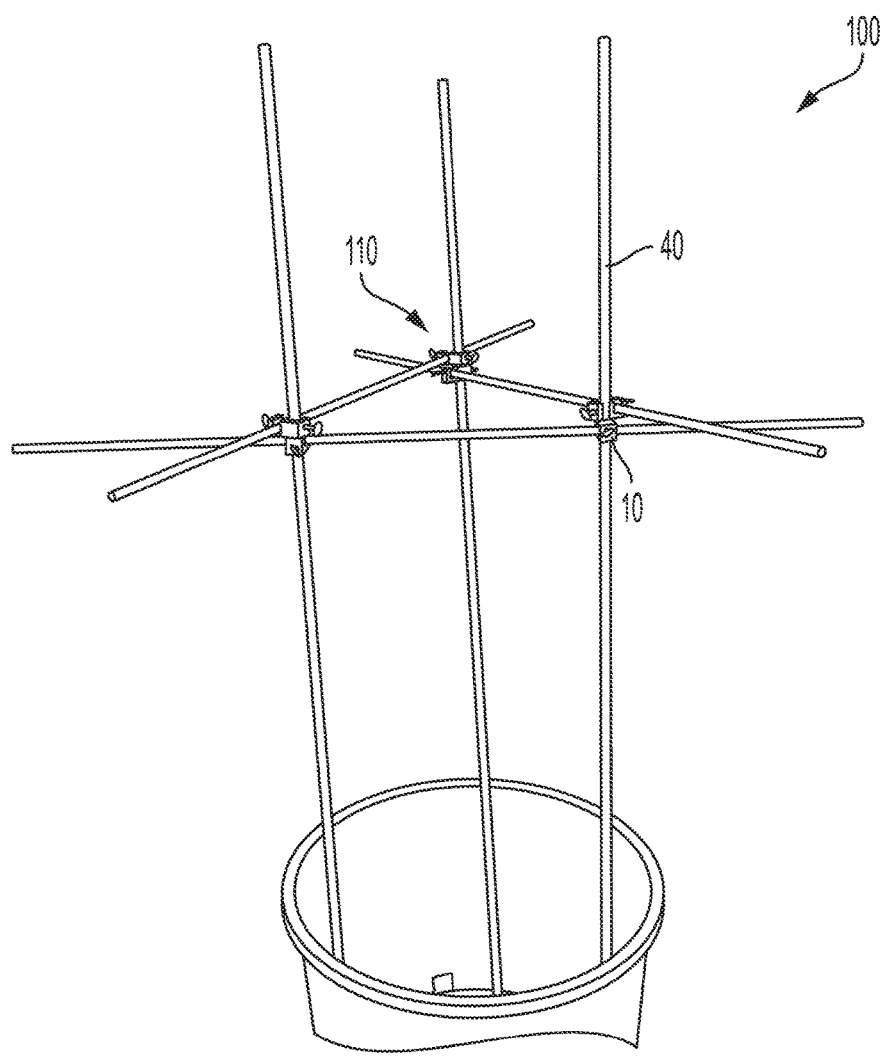
FIG. 5 shows a connector assembly arranged in a triangular configuration, placed in a planting pot for use as a plant support framework.

FIG. 5 shows a connector assembly 100 arranged to create an open triangular framework on a single plane. Three vertical rods 40 are placed in a planter pot, and two adjacent connectors 10 are secured to each vertical rod 40 at a joint 110. In this configuration, the horizontal rods 40 participate in one or more joints 110 to form a triangular framework. This configuration demonstrates that the connector assembly 100 is not limited to orthogonal structures.

Figure 6:
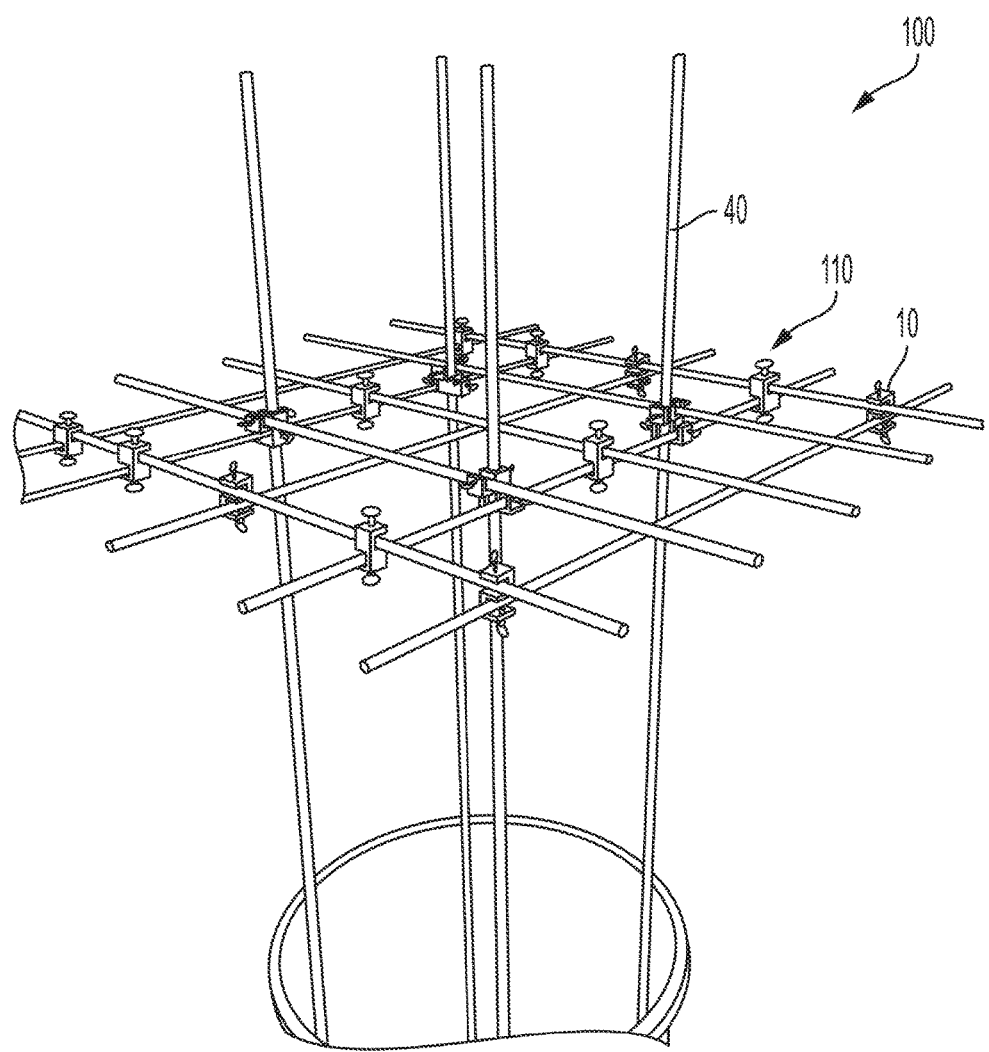
FIG. 6 shows a connector assembly arranged in a horizontal lattice configuration, placed in a planting pot for use as a plant support framework.

In FIG. 6, a horizontal lattice framework is shown. Vertical rods 40 are placed into a planter pot and connected to horizontal rods 40. Additional connectors 10 are attached to parallel rods 40 at one or more joints 110 along the length of each rod 40 and connect to orthogonally oriented rods 40 to form a framework in one plane. This configuration demonstrates that vertical and horizontal rods 40 may participate in joints 110 with horizontal rods 10.

It will be appreciated that with the connector and connector assemblies shown above, a grower of plants may easily construct a framework to support a growing plant. As plants grow, the connectors may be disassembled and reassembled in different configurations, to support the changing shape of the growing plants.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A connector, comprising:
a body having:
   a first U-shaped structure defining a first axis; and
   a second U-shaped structure defining a second axis that is orthogonal to the first axis;
a first fastener that penetrates an outer side wall of the first U-shaped structure and is configured to clamp a rod within the first U-shaped structure; and
a second fastener that penetrates an outer side wall of the second U-shaped structure and is configured to clamp a rod within the second U-shaped structure, wherein
the first U-shaped structure and the second U-shaped structure are formed to share an integrally formed inner wall,
a length of the first U-shaped structure is equal to a height of the second U-shaped structure, and
each of the first U-shaped structure and the second U-shaped structure have a respective outer bottom wall, the outer bottom wall of the first U-shaped structure being formed in a plane with an axial open end of the second U-shaped structure, and the outer bottom wall of the second U-shaped structure being formed in a plane with an axial open end of the first U-shaped structure.

2. The connector of claim 1, wherein the first and second U-shaped structures are configured to have a flat, curved, or polygonal shape.

3. The connector of claim 1, wherein the first and second fasteners are threaded.

4. The connector of claim 1, wherein the first and second fasteners are thumb screws.

5. The connector of claim 1, wherein the connector body is formed of aluminum or aluminum alloy.

6. The connector of claim 1, wherein the outside wall of the first U-shaped structure has one or more holes for one or more fasteners, and the outside wall of the second U-shaped structure has one or more holes for one or more fasteners.

7. A connector assembly, comprising:
one or more rods secured within one or more connector bodies according to claim 1 by one or more fasteners.

8. The connector assembly in claim 7, wherein the assembly is configured to form an open framework.

9. The connector assembly in claim 7, wherein the rods have one or more recesses to receive and secure the fasteners.

10. The connector assembly in claim 7, wherein the rods have one or more holes to receive and secure the fasteners.

11. A connector, comprising:
a body having:
   a first U-shaped structure defining a first axis; and
   a second U-shaped structure defining a second axis that is in a plane that is parallel to a plane of the first axis, and that is offset by a predetermined angle from the first axis;
a first fastener that penetrates an outer wall of the first U-shaped structure and is configured to clamp a rod within the first U-shaped structure; and
a second fastener that penetrates an outer wall of the second U-shaped structure and is configured to clamp a rod within the second U-shaped structure, wherein
the first U-shaped structure and the second U-shaped structure are formed to share an integrally formed inner wall,
a length of the first U-shaped structure is equal to a height of the second U-shaped structure, and
each of the first U-shaped structure and the second U-shaped structure have a respective outer bottom wall, the outer bottom wall of the first U-shaped structure being formed in a plane with an axial open end of the second U-shaped structure, and the outer bottom wall of the second U-shaped structure being formed in a plane with an axial open end of the first U-shaped structure.

12. The connector of claim 11, wherein each of the planes is parallel to internal side walls of its respective U-shaped structure, and wherein each of the planes bisects its respective U-shaped structure through the open end of the U-shaped structure.

13. The connector of claim 11, wherein each of the predetermined angles is 90 degrees.

14. The connector of claim 11, wherein each of the predetermined angles is selected from the group consisting of 30, 45, 60 degrees.

* * * * *